(12) United States Patent
Gerritsen et al.

(10) Patent No.: US 8,987,391 B2
(45) Date of Patent: Mar. 24, 2015

(54) POLYMERIZATION PROCESS WITH IN-SITU INITIATOR FORMATION

(75) Inventors: René Gerritsen, Loosdrecht (NL); Jacobus Schut, Deventer (NL); Johannes Willibrordus Antonius Overkamp, Lemelerveld (NL); Johannes Jacobus Theodorus De Jong, Diepenveen (NL)

(73) Assignee: Akzo Nobel Chemicals International B.V., Amersfoort (NL)

( * ) Notice: Subject to any disclaimer, the term of this patent is extended or adjusted under 35 U.S.C. 154(b) by 26 days.

(21) Appl. No.: 13/704,676

(22) PCT Filed: Jun. 27, 2011

(86) PCT No.: PCT/EP2011/060673
§ 371 (c)(1),
(2), (4) Date: Feb. 19, 2013

(87) PCT Pub. No.: WO2012/000916
PCT Pub. Date: Jan. 5, 2012

(65) Prior Publication Data
US 2013/0211019 A1    Aug. 15, 2013

Related U.S. Application Data

(60) Provisional application No. 61/375,100, filed on Aug. 19, 2010.

(30) Foreign Application Priority Data

Jun. 30, 2010  (EP) ..................................... 10167863

(51) Int. Cl.
C08F 4/34        (2006.01)
C08K 5/09        (2006.01)
C08K 5/14        (2006.01)

(52) U.S. Cl.
CPC ... C08F 4/34 (2013.01); C08K 5/09 (2013.01); C08K 5/14 (2013.01)
USPC ............................... 526/84; 526/344; 526/345

(58) Field of Classification Search
USPC ............................................ 526/84, 344, 345
See application file for complete search history.

(56) References Cited

U.S. PATENT DOCUMENTS 3,923,766 A * 12/1975 Barter ........................... 526/216
3,978,032 A     8/1976 Manner
4,631,063 A * 12/1986 Stockhausen et al. ......... 8/94.21

FOREIGN PATENT DOCUMENTS

| WO | WO 00/17245 A1 | 3/2000 |
| WO | WO 03/054039 A1 | 7/2003 |
| WO | WO 03/054040 A1 | 7/2003 |
| WO | WO 03/087168 A1 | 10/2003 |
| WO | WO 2004/096871 A1 | 11/2004 |
| WO | WO 2008/064877 A1 | 5/2008 |

OTHER PUBLICATIONS

EPO Office Action for Application No. 11 729 404.1-1304 relating to ACD11073 EP P1, dated Nov. 18, 2013.

* cited by examiner

*Primary Examiner* — Robert D. Harlan
(74) *Attorney, Agent, or Firm* — Alice C. Su

(57) ABSTRACT

A process for the polymerization of one or more monomers wherein at least one anhydride and at least one peroxy compound selected from inorganic peroxides, organic hydroperoxides, and peroxyacids are dosed during the polymerization reaction in a continuous or intermittent fashion to a reaction mixture comprising said monomers.

22 Claims, No Drawings

POLYMERIZATION PROCESS WITH IN-SITU INITIATOR FORMATION

This application is the U.S. National Phase of PCT/EP2011/060673 filed on Jun. 27, 2011 and claims the benefit of U.S. Provisional Application No. 61/375,100 filed on Aug. 19, 2010 and European Application No. 10167863.9 filed on Jun. 30, 2010, the contents of each of which are incorporated herein by reference.

The present invention relates to a polymerization process wherein the initiator, more in particular a diacyl peroxide, is formed in-situ.

The polymerization of monomers susceptible to free-radical polymerization, in particular ethylenically unsaturated monomers, more in particular unsaturated vinyl-type monomers such as vinyl chloride, with organic peroxides is well recorded in the literature and has found extensive commercial application.

For optimum results, the rate of decomposition of the organic peroxide at the polymerization temperature should be such that the polymerization can be conducted at a useful rate. Consequently, the polymerization industry prefers, in many cases, to use peroxides that have significant reactivity at relatively low temperatures, so that high polymerization rates at such temperatures can be achieved.

The disadvantage of such highly reactive peroxides is, however, that they are more hazardous to synthesize, transport and use. Often, refrigeration facilities are required for their shipment and storage.

As a solution to this problem, U.S. Pat. No. 3,923,766 proposed the in-situ preparation of diacyl peroxides by adding an alkaline buffering agent, an anhydride, and a peroxygen compound selected from hydrogen peroxide and peroxyacid to the polymerization vessel prior to the start of the polymerization reaction.

Another problem associated with highly reactive peroxides is that they tend to exhaust early at the conventional polymerization temperatures and thus decompose completely before the polymerization reaction has proceeded to a high conversion. The use of larger quantities of more reactive peroxide will overcome premature exhaustion; however, that solution is not desirable for the reason that the polymerization reaction becomes too rapid and the amount of heat generated in the reactor cannot be dissipated adequately. The result can be a runaway polymerization reaction which occurs at higher temperatures than desired with the consequent effect on the physical properties of the polymer caused by the reduction in molecular weight.

A solution to this problem has been provided by the processes described in WO 00/017245, WO 2003/054040, WO 2003/087168, WO 2003/054039, WO 2004/096871, and WO 2004/096871, which require dosing of the highly reactive peroxide to the polymerization mixture during the polymerization reaction, resulting in a better control of the heat of polymerization and a reduction of the polymerization time.

It has now been found that diacyl peroxides can be prepared in-situ during the polymerization reaction by dosing the raw materials to the polymerization mixture during said reaction, thereby solving two problems: there is no need for transporting hazardous highly reactive peroxides and they do not exhaust too early during the polymerization reaction.

Although this may look at first sight as an obvious combination of known processes, it is really surprising that the process indeed works. In order to avoid large peroxide concentrations in the reaction mixture—and, thus, an uncontrollable reaction—only small amounts of raw materials can be dosed to the reaction mixture. As a consequence, the raw materials are present in the reaction mixture in very low concentrations, but will still react with each other at a high rate.

It is even more surprising that this process also works in suspension polymerization reactions using raw materials that end up in different phases. For instance, if hydrogen peroxide and anhydride are used as raw materials, hydrogen peroxide will end up in the aqueous phase, whereas anhydride will end up in the organic phase. And despite their small amounts and presence in different phases, they are still able to react with high rate.

According to the present invention, the process involves the dosing of at least one anhydride and at least one peroxy compound selected from inorganic peroxides, organic hydroperoxides, and peroxyacids in a continuous or intermittent fashion to a monomer-comprising reaction mixture during the polymerization reaction.

Monomers

The process according to the invention is pre-eminently suited to polymerize monomer mixtures comprising vinyl chloride monomer (VCM). Preferably, the process according to the invention involves the polymerization of monomer mixtures comprising at least 50% by weight (% w/w) of VCM, based on the weight of all monomer. Comonomers that can be used are of the conventional type and include vinylidene chloride, vinyl acetate, ethylene, propylene, acrylonitrile, styrene, and (meth)acrylates. More preferably, at least 80% w/w of the monomer(s) being polymerized is made up of VCM, while in the most preferred process the monomer consists essentially of VCM. As is known in the art, the polymerization temperature of such processes to a large extent determines the molecular weight of the resulting resin.

The Peroxy Compound

Preferred peroxyacids to be used in the process according to the present invention are saturated aliphatic and aromatic carboxylic acids. Such peracids can be represented by the general formula $R^1$—C—O—O—H wherein $R^1$ is an aliphatic, e.g., alkyl, radical of from 1 to 20 carbon atoms or an aryl radical of from 6 to 10 carbon atoms. Preferably, the alkyl radical contains from 1 to 12 carbon atoms. The aliphatic group can be branched or straight chain. The alkyl and aryl radicals can contain substituent groups that do not adversely affect the polymerization reaction or polymer product, e.g., alkoxy, halogen, such as chlorine, bromine or fluorine, hydroxyl, amido, cyano, nitroso, nitro, etc. groups.

Examples of peroxyacids include: peracetic acid, permonochloroacetic acid, trifluoroperacetic acid, perdichloroacetic acid, pertrichloroacetic acid, perpropionic acid, permonochloropropionic acid, perdichloropropionic acid, perbromoacetic acid, perbromopropionic acid, per-alpha-chlorolauric acid, per-alpha-dichlorolauric acid, per-12-hydroxystearic acid, per-alpha-bromocapric acid, per-alpha-bromostearic acid, perglycolic acid, peroxylactic acid, perpyruvic acid, 3-chloro-perbenzoic acid, m-bromo-perbenzoic acid, pentafluoroperbenzoic acid, p-tertiarybutyl perbenzoic acid, perisopropionic acid, per-n-butyric acid, perisobutyric acid, pervaleric acid, perpivalic acid, perisovaleric acid, percaproic acid, percaprylic acid, pernonanoic acid, perisononanoic peracid, ethylbutanoic peracid perdecanoic acid, perneodencanoic acid, perheptanoic acid, perundecanoic acid, perlauric acid, pertridecanoic acid, permyristic acid, perpentadecanoic acid, perpalmitic acid, perheptadecanoic acid, perstearic acid, pernonadecanoic acid, pereicosanoic acid, per(alpha-ethyl-decanoic) acid, per(alpha-ethyldodecanoic) acid, per(alpha-phenyldode-canoic) acid, phenylperacetic acid, peroxyfuroic acid, cyclohexane-percarboxylic acid, perbenozic acid, 2-, 3-, and 4-nitroperbenzoic acid, 2-chloro-perbenozic acid, 4-chloro-perbenzoic acid, 2,4- and 3,4-dichloroperbenzoic acid, p-fluoro-perbenzoic acid, 2-methyl-perbenzoic acid, p-isopropylperbenzoic acid, 4-methoxy-perbenzoic acid, 4-cyanoperbenzoic acid, o- and m-aminoperbenozic acid, o- and p-hydroxyperbenzoic acid, o-bromoperbenzoic acid, 2-methyl-perbutyric acid, 2-ethyl perbutyric acid and perphthalic acid.

Preferred peroxyacids include peracetic acid, perpropionic acid, perisobutyric acid, and perpivalic peracid, The peroxyacid can be dosed to the reaction mixture in pure form or dissolved in a solvent in concentrations of 2-100 wt %, preferably 5-50 wt %, more preferably 10-20 wt %. Suitable solvents are water, alcohols such as methanol, ethanol, and isopropanol, and mineral spirits.

The solution may also contain a stabilizer, such as 1-hydroxyethylidene-1,1-diphosphonic acid (also known as Dequest® 2066), dipicolinic acid, or 2,6-pyrimidinecarboxylic acid (also known as Dequest® 2010). The stabilizer is preferably present in the solution in a concentration of 0.00001-0.01 wt %.

The most preferred inorganic peroxide to be added to the reaction mixture is hydrogen peroxide. However, also sources of hydrogen peroxide can be used, i.e., peroxygen compounds which yield hydrogen peroxide when dissolved in the polymerization medium. Examples of such hydrogen peroxide sources are sodium peroxide and potassium peroxide. Also mixtures of hydrogen peroxide and sodium peroxide and/or potassium peroxide can be used.

Hydrogen peroxide is preferably dosed to the reaction mixture as a solution in water with a concentration in the range 0.01-70 wt %, more preferably 0.1-35 wt %, and most preferably 0.2-20 wt %. Preferably, the hydrogen peroxide solution contains sodium or potassium hydroxide in a concentration of 0.01-25 wt %, more preferably 0.1-20 wt %, and most preferably 0.5-10 wt %. The $H_2O_2$:NaOH mole ratio in the solution is preferably about 1:2.

The solution may also contain a stabilizer, such as Dequest® 2066, Dequest® 2010, or dipicolinic acid.

The stabilizer is preferably present in the solution in a concentration of 0.00001-0.01 wt %.

Organic hydroperoxides are represented by the formula $R^2$—O—O—H, wherein $R^2$ is an aliphatic or aromatic radical of from 1 to 20 carbon atoms. They can be used in stead of or in addition to hydrogen peroxide. The aliphatic radical can be branched or straight chain and can be substituted with groups that do not adversely affect the polymerization reaction or polymer product. Preferably, $R^2$ will contain from 3 to 12 carbon atoms.

Examples of suitable organic hydroperoxides include those wherein $R^2$ is methyl, ethyl, n-propyl, isopropyl, secondary butyl, tertiarybutyl, n-pentyl, 2-methylbutyl, 3-methylbutyl, n-hexyl, 2-methylpentyl, 3-methylpentyl, n-heptyl, n-octyl, 4-methylbenzyl, n-nonyl, dimethylbenzyl, n-decyl, n-dodecyl, diphenylmethyl, n-tetradecyl, or n-octadecyl.

The hydroperoxide can be dosed to the reaction mixture in pure form or dissolved in a solvent in concentrations of 2-100 wt %, preferably 5-50 wt %, more preferably 10-20 wt %. Suitable solvents are water, alcohols such as methanol, ethanol, and isopropanol, and mineral spirits.

The solution may also contain a stabilizer, such as Dequest® 2066, Dequest® 2010, or dipicolinic acid. The stabilizer is preferably present in the solution in a concentration of 0.00001-0.01 wt %.

The Anhydride

Suitable anhydrides to be dosed to the reaction mixture according to the present process are anhydrides of aliphatic or aromatic carboxylic acids, preferably saturated monocarboxylic acids represented by the general formula, $R^3$—C(=O)—O—C(=O)—$R^4$, wherein $R^3$ and $R^4$ are independently selected from alkyl, aryl, and cycloalkyl groups. The alkyl radicals can be branched or straight chain. Preferably, the alkyl groups contain from 1 to 20 carbon atoms and more preferably from 1 to 12 carbon atoms. Aryl and cycloalkyl radicals typically contain from 6 to 10 carbon atoms. $R^3$ and $R^4$ can be the same or different.

The alkyl, aryl and cycloalkyl radicals can contain substituents that do not adversely affect the polymerization reaction or polymer product, e.g., alkoxy, halogen such as chlorine, bromine or fluorine, hydroxyl, amido, cyano, nitroso, or nitro substituents.

Preferably, $R^3$ and $R^4$ are straight chain alkyl groups, most preferably, they are both isopropyl groups.

Examples of suitable anhydrides are acetic anhydride, propionic anhydride, butyric anhydride, isobutyric anhydride, pivalic anhydride, valeric anhydride, isovaleric anhydride, 2-methyl butyric anhydride, 2-ethyl butyric anhydride, caproic anhydride, caprylic anhydride, glutaric anhydride, isocaproic anhydride, n-heptanoic anhydride, nonoic anhydride, decanoic anhydride, neodecanoic anhydride, undecanoic anhydride, neoheptanoic anhydride, lauric anhydride, tridecanoic anhydride, 2-ethyl hexanoic anhydride, acetic propionic anhydride, acetic isobutyric anhydride, myristic anhydride, palmitic anhydride, stearic anhydride, phenylacetic anhydride, cyclohexanecarboxylic anhydride, 3-methyl-cyclopentanecarboxylic anhydride, beta-methoxy propionic anhydride, alpha-ethoxy butyric anhydride, benzoic anhydride, o-, m-, and p-toluic anhydride, 2,4,6-trimethylbenzoic anhydride, o-, m-, and p-chlorobenzoic anhydride, o-, m-, and p-bromobenzoic anhydride, o-, m-, and p-nitrobenzoic anhydride, o- and p-hydroxybenozic anhydride, o-, m-, and p-aminobenzoic anhydride, and o-, m-, and p-methoxybenzoic anhydride.

Preferred anhydrides include isobutyric anhydride, acetic anhydride, pivalic anhydride, isovaleric anhydride, neodecanoic anhydride, neoheptanoic anhydride, and 2-ethyl hexanoic anhydride.

By utilizing more than one anhydride it is possible to produce several different diacyl peroxides in the same polymerization medium and thereby conduct the polymerization in the presence of diacyl peroxides having different reactivities. For example, a mixture of acetic and isobutyric anhydrides can be used in conjunction with peracetic acid and/or perisobutyric acid to form, theoretically, diacetyl peroxide, acetyl isobutyryl peroxide and diisobutyryl peroxide.

Furthermore, by using two different symmetrical acid anhydrides with hydrogen peroxide, it is possible to generate three different diacyl peroxides—two of which being symmetrical and one being unsymmetrical. For example, the use of acetic anhydride and isobutyric anhydride would yield diacetyl peroxide, diisobutyryl peroxide, and acetyl isobutyryl peroxide.

By choosing properly the anhydride and the peracid, it is possible to produce a variety of one or more diacyl peroxides, both symmetrical and unsymmetrical, in the polymerization medium. Similarly, in the embodiment wherein both an inorganic peroxide or an organic peroxide are used, a proper choice of the anhydride can result in a variety of symmetrical diacyl peroxides. Since the reactivity of diacyl peroxides partly depends on the nature of the alkyl substituent surrounding the peroxy grouping, this allows to conduct polymerizations with a wide variety of diacyl peroxides without the hazards associated with the use of the peroxide per se.

The anhydride can be dosed to the reaction mixture in pure form or dissolved in a solvent in concentrations of 2-100 wt %, preferably 5-50 wt %, more preferably 10-20 wt %. Suitable solvents are water, alcohols, such as methanol, ethanol, and isopropanol, and mineral spirits.

The solution may also contain a stabilizer, such as Dequest® 2066, Dequest® 2010, or dipicolinic acid. The stabilizer is preferably present in the solution in a concentration of 0.00001-0.01 wt %.

The Resulting Diacyl Peroxides

The diacyl peroxides that are formed in the polymerization mixture preferably have a half-life of 0.0001-1.0 hour at the polymerization temperature, as determined by differential scanning calorimetry-thermal activity monitoring (DSC-TAM) of a dilute solution of the initiator in monochlorobenzene, as is known in the art. Half-life data determined in this way are listed in the Akzo Nobel brochure "Initiators for high polymers" with code 2161, June 2006.

The polymerization temperature is the temperature at which the majority of all monomer (i.e. more than 50% w/w, preferably more than 60% w/w, most preferably more than 75% w/w of the monomer being polymerized) is being polymerized. It is known that the polymerization temperature set-point can be varied over time. Known polymerization temperature variations for polymerizations of, e.g., vinyl chloride include an intentional higher temperature when the polymerization is started and/or a higher temperature upon pressure drop, both used to increase the reactor output. If a variation in the polymerization temperature is applied, then the polymerization temperature is considered to be the average temperature over time from the moment the polymerization temperature is reached until the pressure drop. It is noted that also in the process of the present invention, the polymerization temperature set-point during the start-up and pressure drop stages may be higher than the average polymerization temperature set-point.

Preferred peroxides that are formed in the reaction mixture during the process of the invention are diisobutyryl peroxide, hexanoyl pivaloyl peroxide, 2-ethylbutanoyl-isononanyl peroxide, isobutanoyl-lauroyl peroxide, isobutanoyl-isononanoyl peroxide, acetyl-isobutanoyl peroxide, acetyl-pivaloyl peroxide, isobutanoyl-pivaloyl peroxide, acetyl-isononanoyl peroxide, dipivaloyl peroxide, 2-ethylbutanoyl-pivaloyl peroxide, and acetyl-2-ethylbutanoyl peroxide.

Dosing

It is to be understood that the word "dosing" is used to describe the step of adding the anhydride and peroxy compound to the polymerizing reaction mixture during the polymerization reaction and, thus, at polymerization conditions. The dosing can be done intermittently during the polymerization, meaning that at least two portions of anhydride and peroxy compound are added to the reaction mixture, or it can be continuous, meaning that for a certain period of time the anhydride and peroxy compound are continuously added to the reaction mixture, or any combination of these techniques. Examples of a combination of such techniques include, for instance, a process wherein the anhydride and peroxy compound are first added continuously, then the addition is stopped, and then again they are added continuously. If an intermittent operation is selected, there are at least 2, preferably at least 4, more preferably at least 10, and most preferably at least 20 moments during the polymerization reaction at which the anhydride and peroxy compound are dosed.

In a preferred embodiment, the at least 5 wt %, more preferably at least 10 wt %, even more preferably at least 20 wt %, and most preferably at least 50 wt % of the total amount of peroxy compound and anhydride to be dosed during the process is dosed continuously and/or intermittently to the reaction mixture after at least 10 wt %, preferably at least 20 wt %, and most preferably at least 30 wt % of the monomers has been converted.

In a further embodiment, at least 2%, preferably at least 5%, more preferably at least 10%, even more preferably at least 20%, more preferably at least 40%, and most preferably at least 60%, of all monomer used in the process is polymerized during the dosing period.

The anhydride and peroxy compound can be dosed to the polymerization vessel via separate dosing lines or via the same dosing line. In the latter case, the anhydride and peroxy compound may be pre-mixed just before entering the polymerization vessel. If dosed via separate lines, the anhydride and peroxy compound may both enter the polymerization mixture below the liquid level of the reaction mixture, they may both enter the polymerization vessel above the liquid level of the reaction mixture, or the anhydride may enter below and the peroxy compound may enter above the liquid level, or vice versa.

Preferably, the anhydride enters the vessel below the liquid level; the peroxy compound can enter the vessel either above or below the liquid level. Most preferably, both the anhydride and the peroxy compound enter the vessel below the liquid level and in each other's vicinity.

It is also possible to dose the anhydride and the peroxy compound via the same dosing line by combining the anhydride stream and the peroxy compound stream in one line before entrance into the reactor.

In a further embodiment, the peroxy compound and/or the anhydride is/are dosed using a dosing line containing a static mixer.

If the peroxy compound is an inorganic peroxide or an organic hydroperoxide, the anhydride and peroxy compound are preferably dosed in such a way that the reaction mixture always contains a molar excess of hydrogen peroxide, relative to anhydride.

If the peroxy compound is a peroxy acid, it is preferred to dose the peroxy acid and the anhydride in about stoichiometric amounts.

As already mentioned above, the concentrations of anhydride and peroxy compound in the reaction mixture will be low. Preferably, the anhydride concentration in the reaction mixture does not exceed 3000 ppm during the entire process, based on the total weight of the reaction mixture. More preferably, it does not exceed 2000 ppm, even more preferably it does not exceed 1000 ppm.

The concentration of peroxy compound in the reaction mixture preferably does not exceed 500 ppm during the entire process, based on the total weight of the reaction mixture. More preferably, it does not exceed 300 ppm, even more preferably it does not exceed 200 ppm.

The dosing of anhydride and peroxy compound is preferably controlled by the reaction temperature using a temperature controller, such as a PID controller, a PI controller, a PD controller, and a fuzzy logic controller. Such temperature controllers may use various algorithms such as PID, fuzzy logic or model-based control algorithms.

These temperature controllers are able to control the temperature of the reaction mixture by monitoring the temperature of the reaction mixture and/or the pressure of the gas phase in the polymerization reactor during the polymerization reaction, while at the same time adjusting the dosing rate of the anhydride and peroxy compound to the reaction mixture. On the basis of the difference between the measured value and the desired value, the temperature controller sends signals to one or more dosing units. The one or more dosing units comprise storage containers for the anhydride and peroxy compound to be dosed and a dose rate controlling means, such as a dosing pump and optionally a flow meter. The storage containers are preferably kept at a temperature below about 30° C., more preferably below about 10° C.

Preferably, the temperature controller uses an algorithm comprising proportional, integrating, and derivative functions. Such algorithms and functions are known to the man skilled in the art. The input parameters for the algorithms may be temperature and/or pressure. The input parameter for each function of the algorithm may be the same or different. The temperature of the reaction mixture is measured using a temperature sensing device such as a Pt-100 temperature sensor. The pressure of the gas phase in the reactor is measured using a pressure measuring means such as a conventional pressure transducer.

In polymerization processes in which a gas phase is present, such as in the (co)polymerization of vinyl chloride, it is preferred that the input parameter for the proportional and integral functions is the temperature of the reaction mixture, and the input parameter for the derivative function is the pressure of the gas phase.

The proportional band of the PID controller is preferably at least 0.6%, preferably at least 1.0%, and at most 2.5%, preferably at most 1.5%, and most preferably at most 1.25% around the desired temperature.

The pressure is typically measured in the gas phase of the reactor content, whereas temperature sensing means are typically located below the liquid/gas surface of the reaction mixture.

Preferably, the pressure is used as input parameter for the proportional, integral, and derivative functions of the algorithm used in the temperature controller. Preferably, once the pressure in the polymerization reactor drops, the temperature sensing means will take over control at least partly, and from the pressure drop the temperature is used as input parameter for at least one and preferably for all functions of the algorithm.

The polymerization reaction is preferably conducted at temperatures in the range 20-85° C., more preferably 40-80° C.

The polymerization mixture can be formulated at a temperature below the polymerization temperature and subsequently heated to reach said desired reaction temperature. In such a cold-start process some anhydride and peroxy compound may be added to the reaction mixture at the start of the process, i.e. before the polymerization reaction has started. Alternatively, an additional, so-called first initiator may be added at the start and anhydride and peroxy compound are only added during the polymerization reaction. It is also possible to add a first initiator at the start of the process and to add some of the anhydride and peroxy compound during the heat-up phase, since it will boost the heat up of the reaction mixture. Preferably, from 0-60 wt %, more preferably 5-40 wt %, most preferably 5-20 wt %, of the anhydride and peroxy compound, based on the total weight of the anhydride and peroxy compound used during the polymerization process, is present at the start of the heating-up phase, while the remainder is dosed over a period of at least 1, preferably 2, and more preferably 2-4 hours, depending on the polymerization time. More preferably, the remainder of the anhydride and peroxy compound is dosed from the time the reaction mixture temperature is controlled at the desired reaction temperature. The use of a combination of a first initiator and a small amount of the anhydride and peroxy compound from the start allows a fast heating up and start of the polymerization, since the initiators will already (partly) decompose during the heating of the polymerization mixture. When the polymerization mixture reaches the polymerization temperature, the remainder of the anhydride and peroxy compound can be dosed to the mixture to control the further polymerization rate. Preferably, the dosing is continuous, preferably at a variable rate, since this allows the most accurate control of the polymerization rate and a constant polymerization heat output. The combination of a first initiator and the anhydride and peroxy compound ensures the highest initiator efficiency and space-time reactor yield. This is particularly important for commercial reactors.

In another embodiment, the reaction mixture is formulated at or near the polymerization temperature. In this process, hereinafter called warm-start process, it is not necessary to add a first initiator or anhydride and peroxy compound at the start. However, also in this warm-start process it can be beneficial to add a first initiator or up to 30 wt %, preferably up to 20 wt %, most preferably up to 10 wt %, of the anhydride and peroxy compound immediately after formation of the reaction mixture; the remainder being dosed over time. This procedure is particularly preferred if a certain amount of polymerization inhibitor (a radical trapping species) is present in the reaction mixture. If such a radical scavenger is present, for instance because it is introduced with the monomer wherein it is typically used as a stabilizer, the initially formed peroxide will react with said scavenger, thus preventing a delayed start of the polymerization reaction.

This first initiator preferably has a longer half-life than the diacyl peroxide that is formed in-situ by reacting the anhydride and the peroxy compound. Examples of suitable first initiators are α-cumyl peroxyneodecanoate, 2-(2,2-dimethylpropanoylperoxy)-2-(2-ethylhexanoylperoxy)-4-methyl pentane, 2,4,4-trimethylpentyl-2-peroxyneodecanoate, 3-hydroxy-1,1-dimethyl butyl peroxyneodecanoate, tert-amyl peroxyneodecanoate, tert-butyl peroxyneodecanoate, peroxydicarbonates (e.g. di-(2-ethylhexyl) peroxydicarbonate and di-(sec butyl)peroxydicarbonate), tert butyl peroxyneoheptanoate, tert butyl peroxy pivalate, tert amyl peroxypivalate, and dilauroyl peroxide.

The polymerization process can be conducted as a mass process wherein the reaction mixture is predominantly monomer or as a suspension process wherein the reaction mixture typically is a suspension of monomer in water, or as an emulsion or micro-emulsion process wherein the monomer typically is emulsified in water. In these processes the usual additives will have to be used. For example, if the monomer is present in the form of a suspension in water, the usual additives like surfactant(s), protective colloid(s), anti-fouling agent(s), pH-buffer(s), etc. may be present. Depending on the type of polymer that is desired, each of the above-mentioned processes may be preferred. The process according to the invention is especially suited for suspension processes. For VCM polymerizations, suspension processes are preferred.

Because the polymerization rate can be controlled very adequately, the polymerization process becomes safer. More specifically, when the dosing is stopped, the polymerization halts very quickly. This means that where a conventional process rate is limited for safety reasons (initiator is present and a too high concentration will lead to an uncontrollable run-away reaction), the present process is not hampered by such safety restrictions. Hence, with the present process higher polymerization rates can be achieved. This opens up the possibility to conduct the polymerization reaction in a continuous fashion, or in a combination of batch and continuous fashions. The skilled person will have no difficulty in converting the above information, as presented for batch operations, into a (semi-)continuous operation mode. As an example, it is noted that in order to achieve a good control over the polymerization rate in a continuous tube-like reactor, it is necessary to add the anhydride and peroxy compound at various addition points in the reactor, with the addition rate having to be chosen such that the polymerization rate is adequate until the next addition point. Hence, in such a case typically a multitude of controlling and addition points will be necessary.

In a preferred embodiment, an alkaline buffering reagent is present in the reaction mixture. The alkaline buffering agent should be soluble in the polymerization medium and/or the phase wherein the anhydride and peroxy compound are present in order to enable the formation of the salt of the carboxylic acid released as by-product. Suitable alkaline buffering agents are the carbonates and bicarbonates of, e.g., sodium, potassium and calcium, as well as sodium hydroxide, sodium acetate, borax, potassium tartrate, sodium citrate, trisodium phosphate, sodium pyrophosphate, ammonium hydroxide, and organic bases, e.g., the Triton surfactants. Suitable organic bases are those soluble organic compounds that can abstract a hydrogen atom (proton) from hydrogen peroxide, the peroxyacid, or the organic hydroperoxide. Examples of such compounds include: pyridine, pyrrolidone, 1,4-dioxane, tetrahydrofuran and quaternary ammonium hydroxide, such as, tetramethylammonium hydroxide, trimethyl-s-butyl ammonium hydroxide, trimethyl neomenthylammonium hydride, tetraethylammonium hydroxide, trimethyl cetylammonium hydroxide, dioctadecyl dimethylammonium hydroxide, octadecyl dimethyl benzyl ammonium hydroxide, and benzyl trimethylammonium hydroxide (Triton B). Quaternary ammonium hydroxides are preferred. These compounds dissociate in aqueous solution and have the same basic strength in water as sodium or potassium hydroxide.

The amount of alkaline buffering reagent used is not critical. A suitable concentration of buffering reagent is from about 0.01 percent to about 10 percent by weight, and preferably from about 0.5 percent to about 1.5 percent, of the monomer feed. The buffering reagent is used to maintain the pH of the reaction mixture between 6 and 12, preferably between 8 and 9.

After the polymerization, the resulting (co)polymer will be worked up as is usual in the art. For example, polymers obtained by a suspension polymerization according to the invention will be submitted to the usual drying and screening steps.

Preferably, the resulting polymer is characterized in that it contains less than 50 ppm of residual initiator, more preferably less than 40 ppm, and most preferably less than 25 ppm of initiator, determined immediately after drying for 1 hour at 60° C. and screening.

EXAMPLES

Example 1

A temperature controlled 10-liter stainless steel Büchi reactor equipped with one baffle, a two-bladed stirrer, a pressure transducer, a vinyl chloride (VCM) feed line, and a nitrogen purge line was charged with: 4540 g demineralized water, 2.25 g Alcotex® B72 (polyvinyl-acetate/alcohol) as a 5% solution in demineralized water, 0.45 g Gohsenol® GH-23 (polyvinyl-acetate/alcohol) as a 5% solution in demineralized water, and 6 g NaHCO$_3$ (solids). The reactor was closed and pressurized to 15 barg, using nitrogen. When no leaks were observed, the reactor was evacuated and pressurized with nitrogen up to 5 barg three times, in order to flush out virtually all air. Next, the reactor was evacuated and charged with 2880 g VCM (ex Shin-Etsu Rotterdam), followed by heating the reactor to polymerization temperature (57° C.) in 30 min. Stirring speed: 800 rpm. The flow rate for cooling/heating via the reactor shell was 65 l/hr.

In the meantime, two mixtures were freshly prepared (and kept at T<20° C. during the whole process):
Mix A: isobutyric anhydride (10% in methanol)
Mix B: a mixture of H$_2$O$_2$ (0.38%), NaOH (0.88%) and Dequest® 2060 (0.0008 wt %) in demineralized water.

After the reactor temperature reached a setpoint of 57° C., Mix A (at the bottom of the reactor) and Mix B (at the top of the reactor) was started in such a way, that the anhydride:H$_2$O$_2$ molar ratio was 1:0.5. Mix A (1 g/min) and Mix B were dosed at a constant rate.

During the polymerization process, the reactor temperature was kept constant at 57° C.

After a pressure drop of 2 bar in the reactor at the end of the reaction, the reactor was cooled to 20-25° C., evacuated, and freed of virtually all remaining VCM. The polymer was obtained after filtration, washing, and drying (at 50° C. for 10 hours).

Table 1 shows the properties of the final PVC product.

Example 2

Example 1 was repeated, except that the dosing rates of Mix A and Mix B were controlled by changes in temperature. When the difference in temperature between the inside of the reactor and the incoming cooling water (at a flowrate of 65 l/min) became larger than 10° C., dosing of Mix A and Mix B was temporarily stopped. After the above mentioned difference in temperature became smaller than 6° C., the dosing of Mix A and Mix B was continued again. Again, table 1 shows the properties of the final PVC product.

Example 3

Example 1 was repeated, except that:
Mix B was a mixture of H$_2$O$_2$ (1.13%), NaOH (0.88%) and Dequest 2060 (0.0008 wt %) in demineralized water,
Mix A was dosed from the top of the reactor and Mix B was dosed from the bottom of reactor, and
the anhydride:H$_2$O$_2$ molar ratio was 1:1.5.
Again, table 1 shows the properties of the final PVC product.

Example 4

Example 3 was repeated, except that Mix A contained 9.7% isobutyric anhydride in methanol, Mix B was a mixture of 4.89% peroxyacetic acid and 0.004 wt % Dequest® in demineralized water, and the anhydride:peroxyacetic acid molar ratio was 1:0.98.
Table 1 shows the properties of the final PVC product.

Comparative Example 5

A temperature controlled 10-liter stainless steel Büchi reactor equipped with one baffle, a two-bladed stirrer, a pressure transducer, a vinyl chloride (VCM) feed line, and a nitrogen purge line was charged with: 4540 g demineralized water, 3.0 g Alcotex® B72 (polyvinyl-acetate/alcohol) as a 5% solution in demineralized water, 0.6 g Gohsenol® GH-23 (polyvinyl-acetate/alcohol) as a 5% solution in demineralized water, and 6 g NaHCO$_3$ (solids). The reactor was closed and pressurized to 15 barg, using nitrogen. When no leaks were observed, the reactor was evacuated and pressurized with nitrogen up to 5 barg three times, in order to flush out virtually all air. Next, the reactor was evacuated and charged with 2880 g VCM (ex Shin-Etsu Rotterdam), followed by heating the reactor to polymerization temperature (57° C.) in 30 min. Stirring speed: 800 rpm. The flow rate for cooling/heating via the reactor shell was 65 l/hr.

In the meantime, two mixtures were freshly prepared (and kept at T<20° C. during the whole process):
Mix A: isobutyryl chloride (40.4% in isododecane; ex-Shiva®)
Mix B: a mixture of $H_2O_2$ (0.74%), NaOH (1.73%) and Dequest® 2060 (0.016 wt %) in demineralized water.

After the reactor temperature reached 57° C., the dosing of Mix A and Mix B (both at the bottom of the reactor) was started in such a way, that the isobutyryl chloride:$H_2O_2$ molar ratio was 1:0.4. Mix A (1 g/min) and Mix B were dosed at constant rate. During the polymerization process the reactor temperature was kept constant at 57° C.

A pressure drop was not reached. After 230 minutes the reaction was terminated manually and the reactor was cooled down to room temperature.

Table 1 shows the properties of the final PVC product.

TABLE 1

| Example | Initiator Consumption (ppm)[1] | Constant pressure time (min)[2] | Vinyl chloride conversion (%) | D50 (μm)[3] | Bulk density (kg/m³) | PVC porosity (%)[4] |
|---|---|---|---|---|---|---|
| 1 | 2180 | 152 | 91 | 152 | 499 | 20.7 |
| 2 | 1710 | 221 | 92 | 152 | 491 | 20.3 |
| 3 | 5170 | 335 | 85 | 92 | 446 | 25.0 |
| 4 | 3550 | 216 | 90 | 134 | 487 | 21.9 |
| 5 (comp) | 6330 | not reached | 12.4 | 55.8 | 217 | |

[1] Calculated as the total amount of isobutyric anhydride or isobutyryl chloride dosed.
[2] The time till pressure drop; a measure of the polymerization rate.
[3] PVC particle size
[4] dioctyl phthalate (DOP) absorption

The invention claimed is:

1. A process for the polymerization of one or more monomers wherein at least one anhydride and at least one peroxy compound chosen from inorganic peroxides, organic hydroperoxides, and peroxyacids are dosed during the polymerization reaction in a continuous or intermittent fashion to a reaction mixture comprising said monomers,
wherein at least 50 wt % of the one or more monomers is vinyl chloride.

2. The process according to claim 1 wherein the peroxy compound is hydrogen peroxide.

3. The process according to claim 1 wherein peroxy compound is a peroxyacid is selected from the group consisting of peracetic acid, perpropionic acid, perisobutyric acid, perpivalic peracid, perisononanoic peracid, and ethylbutanoic peracid.

4. The process according to claim 1 wherein the anhydride is selected from the group consisting of isobutyric anhydride, acetic anhydride, pivalic anhydride, isovaleric anhydride, neodecanoic anhydride, neoheptanoic anhydride, and 2-ethyl hexanoic anhydride.

5. The process according to claim 1 wherein the peroxy compound and the anhydride are dosed to the reaction mixture at at least 2 moments during the polymerization reaction.

6. The process according to claim 1 wherein the peroxy compound and the anhydride are dosed via separate dosing lines.

7. The process according to claim 1 wherein the peroxy compound and the anhydride are dosed via the same dosing line.

8. The process according to claim 1 wherein the peroxy compound and/or the anhydride is/are dosed using a dosing line containing a static mixer.

9. The process according to claim 2 wherein the reaction mixture during the polymerization reaction contains a molar excess of hydrogen peroxide relative to anhydride.

10. The process according to claim 1 wherein at least 5 wt % of the total amount of peroxy compound and anhydride to be dosed during the process is dosed to the reaction mixture after at least 10 wt % of all monomers has been converted.

11. The process according to claim 1 wherein the anhydride concentration in the reaction mixture does not exceed 3000 ppm, based on the total weight of the reaction mixture, during the entire process.

12. The process according to claim 1 wherein the peroxy compound concentration in the reaction mixture does not exceed 500 ppm, based on the total weight of the reaction mixture, during the entire process.

13. The process according to claim 1 wherein the peroxy compound and the anhydride are dosed to the reaction mixture at at least 4 moments during the polymerization reaction.

14. The process according to claim 1 wherein the peroxy compound and the anhydride are dosed to the reaction mixture at at least 10 moments during the polymerization reaction.

15. The process according to claim 1 wherein the peroxy compound and the anhydride are dosed to the reaction mixture at at least 20 moments during the polymerization reaction.

16. The process according to claim 1 wherein at least 10 wt % of the total amount of peroxy compound and anhydride to be dosed during the process is dosed to the reaction mixture after at least 10 wt % of all monomers has been converted.

17. The process according to claim 1 wherein at least 20 wt % of the total amount of peroxy compound and anhydride to be dosed during the process is dosed to the reaction mixture after at least 10 wt % of all monomers has been converted.

18. The process according to claim 1 wherein at least 50 wt % of the total amount of peroxy compound and anhydride to be dosed during the process is dosed to the reaction mixture after at least 10 wt % of all monomers has been converted.

19. The process according to claim 1 wherein at least 5 wt % of the total amount of peroxy compound and anhydride to be dosed during the process is dosed to the reaction mixture after at least 30 wt % of all monomers has been converted.

20. The process according to claim 1 wherein at least 10 wt % of the total amount of peroxy compound and anhydride to be dosed during the process is dosed to the reaction mixture after at least 30 wt % of all monomers has been converted.

21. The process according to claim 1 wherein at least 20 wt % of the total amount of peroxy compound and anhydride to be dosed during the process is dosed to the reaction mixture after at least 30 wt % of all monomers has been converted.

22. The process according to claim 1 wherein at least 50 wt % of the total amount of peroxy compound and anhydride to be dosed during the process is dosed to the reaction mixture after at least 30 wt % of all monomers has been converted.

* * * * *